(12) United States Patent
Gu et al.

(10) Patent No.: US 8,131,250 B2
(45) Date of Patent: Mar. 6, 2012

(54) SELF-SYNCHRONIZED RADIO FREQUENCY INTERCONNECT FOR THREE-DIMENSIONAL CIRCUIT INTEGRATION

(75) Inventors: Qun Gu, Los Angeles, CA (US); Zhiwei Xu, Los Angeles, CA (US); Jenwei Ko, Los Angeles, CA (US); Mau Chung Frank Chang, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1003 days.

(21) Appl. No.: 11/356,770

(22) Filed: Feb. 17, 2006

(65) Prior Publication Data

US 2006/0256964 A1    Nov. 16, 2006

Related U.S. Application Data

(60) Provisional application No. 60/654,264, filed on Feb. 18, 2005.

(51) Int. Cl.
*H04B 1/28* (2006.01)
(52) U.S. Cl. ....... 455/333; 455/550.1; 455/73; 257/135; 257/277; 257/278; 257/71; 438/74

(58) Field of Classification Search ............... 455/343.2, 455/333, 73, 550.1; 257/618, 734, 135, 277, 257/278, 71; 438/74
See application file for complete search history.

(56) References Cited

U.S. PATENT DOCUMENTS

| | | | |
|---|---|---|---|
| 6,927,490 B2* | 8/2005 | Franzon et al. | 257/734 |
| 7,145,219 B2* | 12/2006 | Faris | 257/618 |
| 2006/0194564 A1* | 8/2006 | Hokimoto et al. | 455/343.2 |

OTHER PUBLICATIONS

J. Xu, L. Luo, S. Mick, J. Wilson, P. Franzon, AC Coupled Interconnect for Dense 3-D ICs, "AC Coupled Interconnect for Dense 3-D ICs," in IEEE Transactions on Nuclear Science (TNS). vol. 51(5), Oct. 2004, pp. 2156-2160.*

(Continued)

*Primary Examiner* — Jungpeng Chen
(74) *Attorney, Agent, or Firm* — Gates & Cooper LLP

(57) ABSTRACT

A Self-Synchronized Radio Frequency RF-Interconnect (SS-RFI), based on capacitor coupling and peak detection, for vertically interconnecting active device layers in three-dimensional (3D) integrated circuits (IC), as well as wireless communication and RF signal transmission/receiving.

10 Claims, 9 Drawing Sheets

OTHER PUBLICATIONS

S. Mick, L. Luo, J. Wilson, P. Franzon, Buried Bump and AC Coupled Interconnection Technology, IEEE Trans. Adv.Packaging, 27(1), Feb. 2004, pp. 121-125.*

S. E. Mick, J. M. Wilson, and P. Franzon, "4 Gbps AC Coupled Interconnection," , IEEE Custom Integrated Circuits Conference, May 12-16, 2002, pp. 133-140.*

J. Xu, L. Luo, S. Mick, J. Wilson, P. Franzon, "AC Coupled Interconnect for Dense 3-D ICs," in 2003 IEEE Nuclear Science Symposium Conference Record. vol. 1, Oct. 2003, pp. 125-129.*

Xu et al., "AC Coupled Interconnect for Dense 3-D ICs"; 2003 IEEE Nuclear Science Symposium Conference Record, vol. 1, pp. 125-129, 2004.

* cited by examiner

SELF-SYNCHRONIZED RADIO FREQUENCY INTERCONNECT FOR THREE-DIMENSIONAL CIRCUIT INTEGRATION

CROSS-REFERENCE TO RELATED APPLICATIONS

This application is related to the following co-pending and commonly-assigned application:

U.S. Provisional Patent Application Ser. No. 60/654,264, filed on Feb. 18, 2005, by Qun Gu, Zhiwei Xu, Jenwei Ko, and Mau-Chung F. Chang, entitled "SELF-SYNCHRONIZED RADIO FREQUENCY INTERCONNECT FOR THREE-DIMENSIONAL CIRCUIT INTEGRATION,";

which application is incorporated by reference herein.

STATEMENT REGARDING FEDERALLY SPONSORED RESEARCH AND DEVELOPMENT

This invention was made with Government support under Grant No. MDA972-00-1-0013 awarded by the Army. The Government has certain rights in this invention.

BACKGROUND OF THE INVENTION

1. Field of the Invention

The present invention relates to interconnection between active device layers, and more specifically, a self-synchronized radio frequency interconnect for three-dimensional circuit integration.

2. Description of the Related Art

Data communication, especially wireline communications comprised of inter- or intra-chip interconnects, has been a topic of interest for many years. Significant efforts and attentions have being focused on the improvement of systems performance with less power and cost overhead, which are the key issues for all such communications systems.

What is needed, however, is a more efficient, more configurable, higher field, lower cost and higher performance solution.

SUMMARY OF THE INVENTION

The present invention discloses a novel Self-Synchronized Radio Frequency (RF) Interconnect (SSRFI) technology, based on capacitor coupling and peak detection, which has been successfully demonstrated in 0.18 μm CMOS technology. This SSRFI can be used effectively for vertical active device layers interconnection in three-dimensional (3D) integrated circuits (IC) and also for wireless communication and RF signal transmission/receiving. The SSRFI circuit was tested by transmitting/receiving a Pseudo Random Binary Sequence (PRBS) with a data rate of 3 gigabit per second (Gbit/s), $1.2 \times 10^{-10}$ bit error rate (BER), consuming 4 milliwatts (mW) from a 1.8 volt (V) supply, wherein the root-mean-square (rms) jitter value is measured at about 1.28 ps. The combined transmitter/receiver (Tx/Rx) occupies only 0.02 mm².

DETAILED DESCRIPTION OF THE INVENTION

In the following description of a preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention provides efficient vertical interconnection between active device layers, with low cost, high yield and high performance. The present invention outperforms other interconnect architectures in the following aspects: lower power consumption, lower design complexity, smaller chip area, higher speed, as well as better signal integrity performance. What is more, this technique can also be applied in short and long distance wireline or wireless signal communication.

Technical Description

With the dramatic developments in semiconductor technology and circuit design, more sophisticated systems have been implemented on a single chip. While the expanding market keeps pushing for the requirements for higher speed, lower power, more powerful and cheaper single chip systems, it is actually becoming harder for conventional planar technology to design multi-function and low cost single chip systems, because of the parasitic interconnect effect in deep sub-micron technologies, such as high parasitic capacitance, short-channel effect and strong cross-talk between wires. Furthermore, conventional planar technology also faces fundamental physical limits and will encounter more significant interconnect issues in the future. All these have large impacts on the next generation IC development.

3D integration has been proposed as an alternative to overcome the above drawbacks to allow the stacking of active device layers or chips. With this alternative, 3D ICs will surpass traditional two-dimensional (2D) integration in many aspects: less chip area, less power consumption, more relaxed timing constraints, higher performance and lower cost. Therefore, 3D integration will gradually become the mainstream for future IC development.

However, in 3D integration, several key obstacles must be solved, one of which is effective vertical interconnection among multiple active device layers. In the conventional method, vertical interconnections are formed by etching vias through layers and depositing metal studs to physically connect active device layers, such as shown in FIG. 1.

Figure 1:
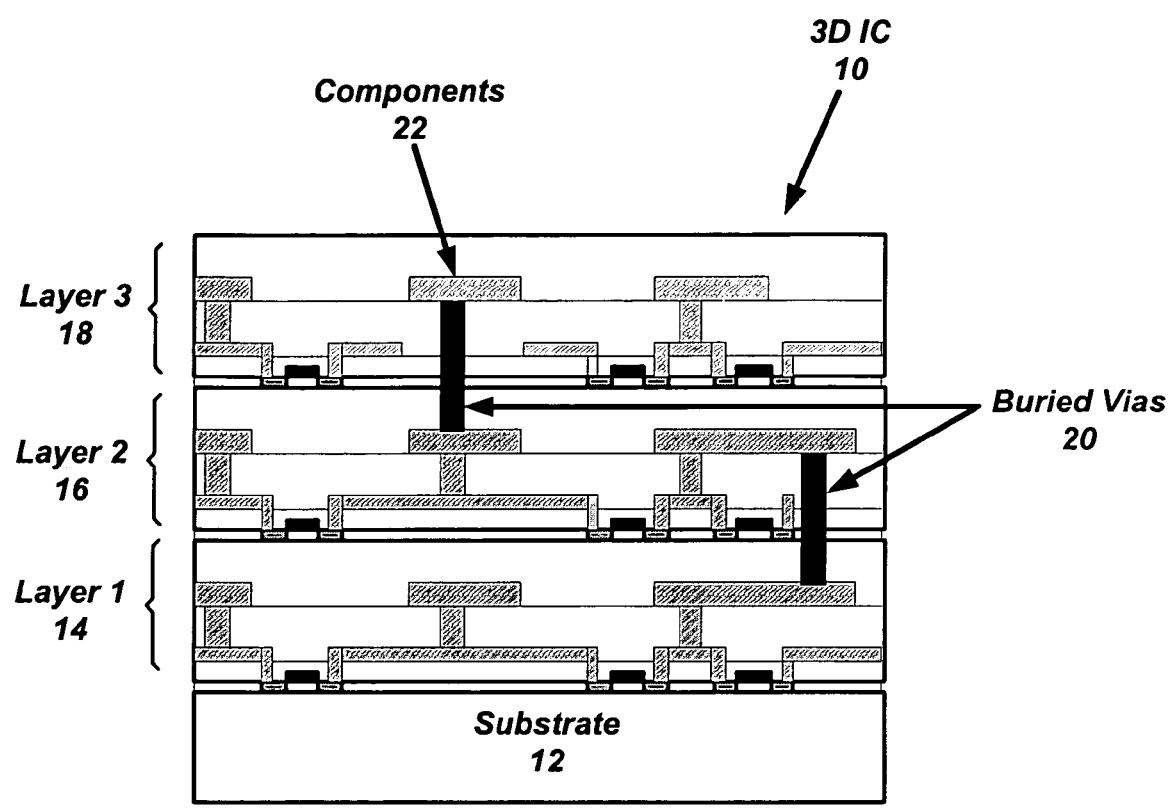
FIG. 1 illustrates a buried via interconnect method in a 3D IC.

FIG. 1 is a cross-section side-view schematic of a 3D IC 10. The IC 10 includes a substrate 12, layers 14, 16 and 18 (labeled as Layer 1, Layer 2 and Layer 3, respectively) and buried vias 20 (with studs) connecting components 22 on the various layers 14, 16 and 18.

This conventional method has several constraints. First, etching vias 20 between active layers 14, 16 and 18 requires improving materials and processing techniques, which increases fabrication complexity and cost. Second, this method becomes less manufacturable when the total number of vertical active layers 14, 16 and 18 becomes large, leading to increased etching depth and vertical line parasitics. Third, the parasitics together with the etching vias 20 greatly affects system performance. Fourth, a vias-and-studs interconnection consumes direct current (DC) power when driving signals. Consequently, this conventional vertical interconnect method is a potentially low yield, low performance and high cost approach.

Figure 2:
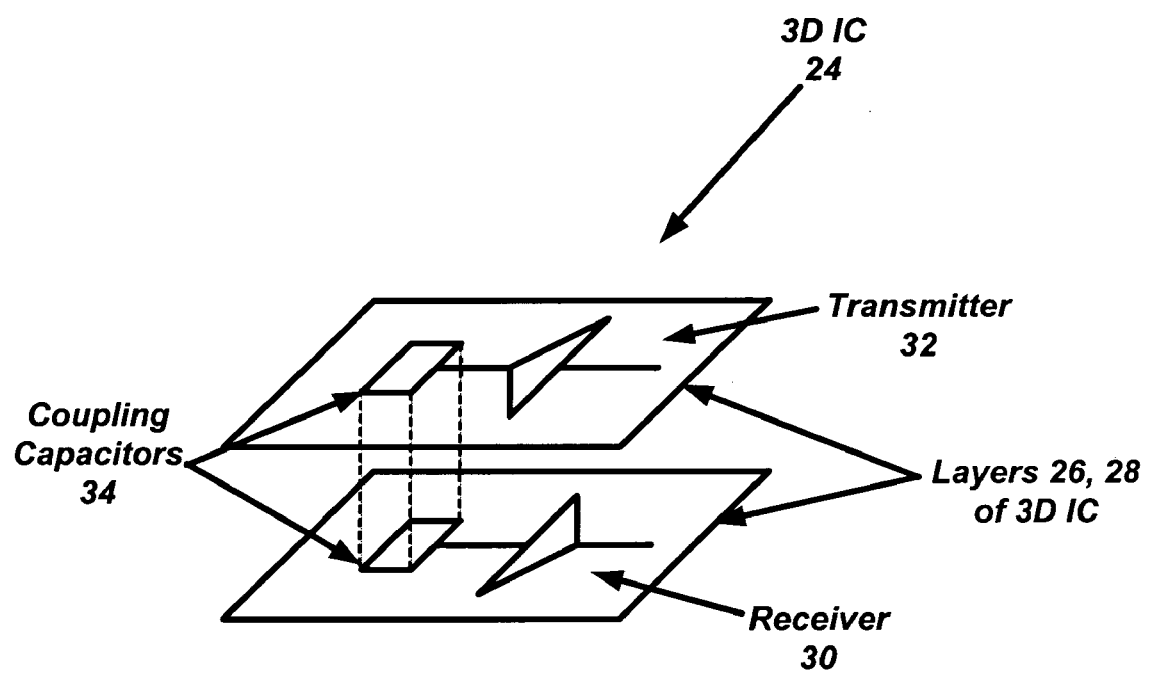
FIG. 2 illustrates a capacitor coupling interconnect method in a 3D IC.

FIG. 2 illustrates an embodiment of the present invention, which provides an alternating current (AC) coupling method using a Self-Synchronized Radio Frequency (RF) Interconnect (SSRFI) for vertically interconnecting components in a 3D IC, in order to overcome the drawbacks faced by direct physical connection. In FIG. 2, a 3D IC 24 includes first and second layers 26 and 28, wherein the first layer 26 includes a receiver 30 and the second layer 28 includes a transmitter 32. In SSRFI, one or more coupling capacitors 34 provide an AC coupling method that interconnects the receiver 30 and transmitter 32 on the first and second layers 26 and 28.

The present invention provides a number of benefits. First, the AC coupling method eliminates DC power consumption when driving the signal. Second, the AC coupling method only requires standard fabrication techniques, which eliminates the requirements of complex etching, alignment and metalization processing, so that the system is low cost and high yield. Third, the SSRFI significantly improves system performance with lower design overhead and power consumption. Therefore, compared with traditional vertical interconnection in 3D ICs, the SSRFI-based AC coupling method is more efficient, more configurable, higher field, lower cost and a higher performance solution.

In addition, the SSRFI can also be applied to other RF communications, such as microwave signal communications. For many decades, RF signals have been transmitted through either free space or guided mediums. In free space, the efficient transmission and receiving of RF signals require the antenna size to be comparable with the signal wavelength, which is usually too large to be implemented in ultra-large scale integration (ULSI).

Figure 3A:
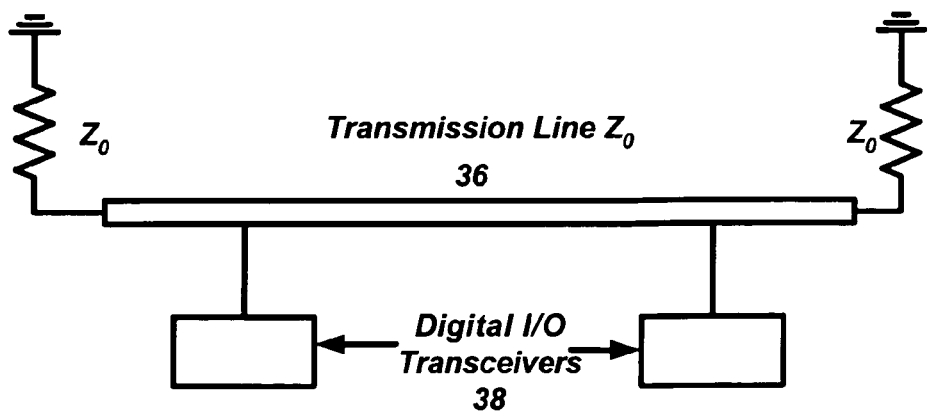
FIGS. 3A, 3B and 3C illustrate high speed digital interconnect architectures.

When transmitting RF signals through a guided medium, one conventional method is to use a direct coupled interconnect (DCI) over a matched transmission line 36, such as shown in FIG. 3A, interconnecting digital I/O transceivers 38. This typically requires a high signaling level and high output driver current to secure a sufficient noise margin. In addition, DCIs consume significant DC power during data transmission, because of the use of direct coupling. All these constraints limit the application of DCIs for ULSI interconnects.

Figure 3B:
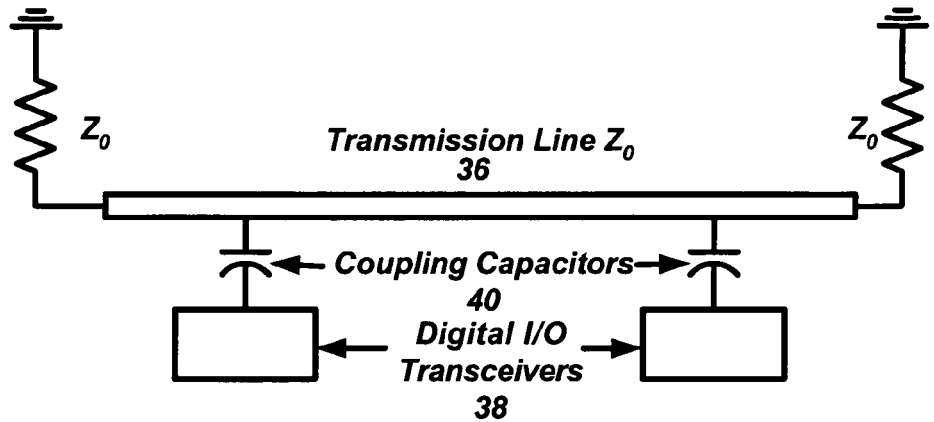

Another method, capacitive coupled interconnects (CCIs), as shown in FIG. 3B, have been used in high data rate backplane communications. FIG. 3B includes a matched transmission line 36, interconnecting digital I/O transceivers 38 and coupling capacitors 40. In this embodiment, the CCIs do not consume DC power due to their AC coupling feature. However, the CCIs limit data transmission efficiency because they require extra data encoding and decoding on signals, and the non-trivial encoding/decoding circuitry increases the overhead for circuit design, power consumption and chip area.

Figure 3C:
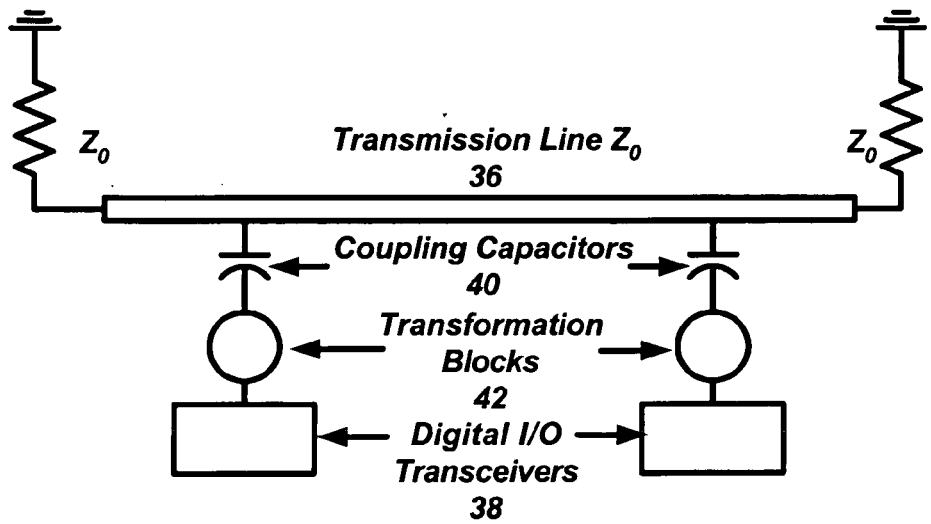

The constraints imposed by DCIs and CCIs could be improved by using previously proposed RF interconnects (RFIs). These RFIs require the transmitter 38 to up-convert a baseband signal with the RF carrier before sending it to the channel 36 through a coupling capacitor 40, and then require the receiver 38 to down-convert the signal with the same RF carrier to recover the baseband signal, as shown in FIG. 3C. FIG. 3C includes a matched transmission line 36, interconnecting digital I/O transceivers 38, coupling capacitors 40 and transformation blocks 42.

Although previous RFIs improve transmission efficiency, they still have several disadvantages. First, both transmitter 38 and receiver 38 require precise local oscillator (LO) carriers for both frequencies and phases for effective signal modulation and demodulation, which dramatically increases the circuit design complexity. Second, the LO carriers in both the transmitter 38 and receiver 38 must be synchronized, which requires better crystal and oscillation circuits. Moreover, to realize synchronization, the receiver 38 needs some kind of frequency or phase lock loop, which make the interface circuit complicated. In addition, this synchronization approach decreases system performance in high frequency applications and increases power consumption.

In order to overcome the drawbacks of previous RFIs, the SSRFI of the present invention substantially decreases the complexity of the design, improves the system performance and makes the data communications more efficient.

As for the RF transceiver (Tx) design, since the bandwidth of signals and the frequency of the carrier keep increasing, signal recovery is a bottleneck for data communications, especially in noisy environments. Currently, there are several methods used to recover signals.

One popular method is to use clock data recovery (CDR) to recover the clock first and then use the recovered clock to obtain the synchronized data. Another method is to use a Costos loop to recover the carrier from the modulated data, and then use the recovered carrier to demodulate the received data to recover the original baseband signal.

However, these methods require synchronization loops, which are non-trivial in design. Moreover, such circuitry increases the system's complexity, consumes much power and contributes lots of noise, etc. The SSRFI of the present invention, on the other hand, outperforms other signal transmitting/receiving methods in design complexity, power consumption, chip area and signal integrity due to efficient design. For example, the SSRFI of the present invention has a smaller chip area and less power dissipation than previous interconnection architectures.

Instead of using synchronized LO for demodulation in receiver, self-synchronized peak detection circuitry is used to recover the baseband signal without using an extra synchronization scheme, which simplifies the circuit design and relaxes the need to generate a precise frequency and phase from a receiver synthesizer.

In this SSRFI architecture, the two transformation blocks 42 shown in FIG. 3C are an Amplitude Shift Keying (ASK) modulator in the transmitter 38 and a peak detector in the receiver 38, respectively. The ASK modulator in the transmitter 38 is used to generate an ASK modulated signal from the original baseband signal. The peak detector in the receiver 38 is used to recover the ASK modulated signal and convert it back to the original baseband signal.

Figure 4:
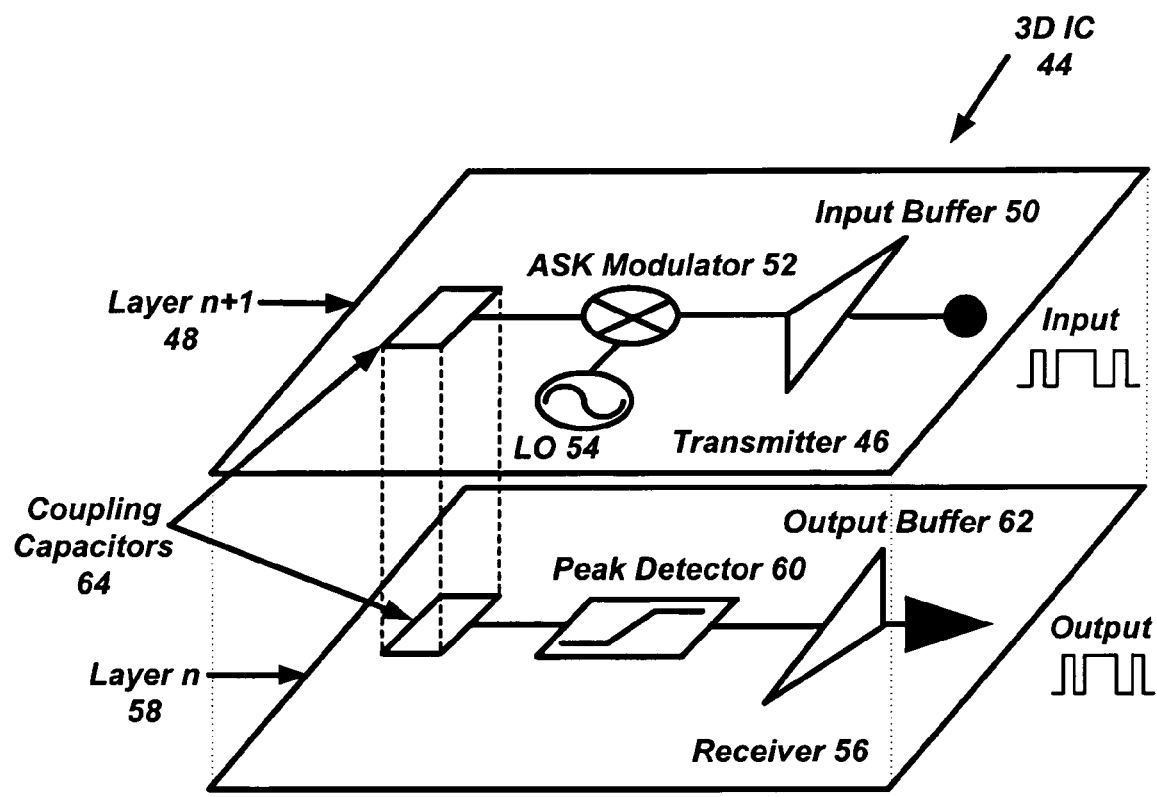
FIG. 4 illustrates a SSRFI circuit architecture.

This SSRFI circuit architecture is shown in FIG. 4. In a 3D IC 44, a transmitter 46 resides on layer n+1 48 and includes an input buffer 50, ASK Modulator 52 and LO 54. The receiver 56 resides on layer n 58 and includes a peak detector 60 and output buffer 62. The layers 48 and 58 are interconnected by coupling capacitors 64.

Figure 5:
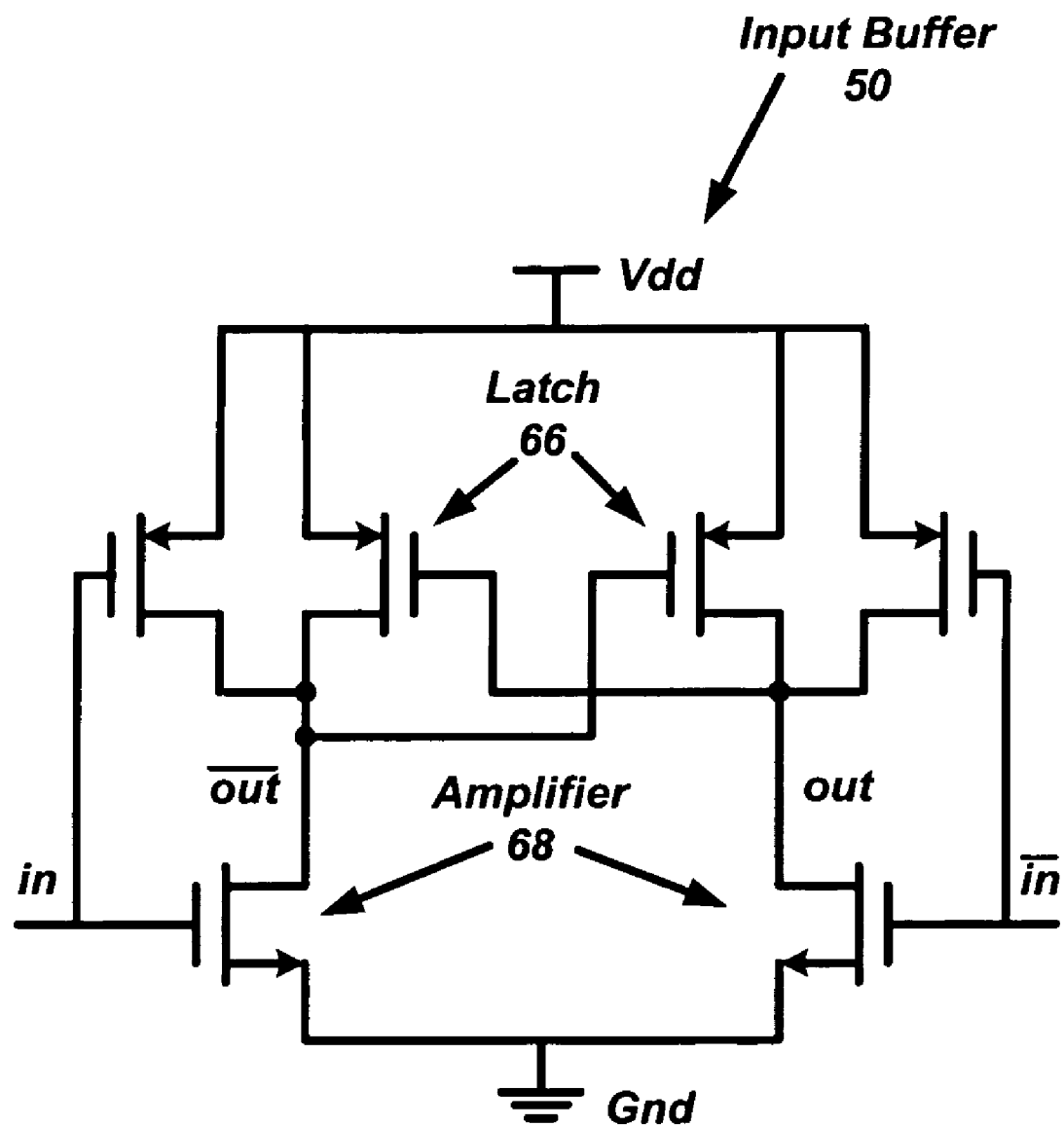
FIG. 5 illustrates an Input Buffer structure.

The input buffer 50 in the transmitter 46, shown in FIG. 5, is used to amplify the signals with sufficient gain to drive the subsequent ASK Modulator 52. Specifically, the input buffer 50 regenerates a rail-to-rail signal to facilitate subsequent ASK modulation. The input buffer 50, which is comprised of a cross-coupled latch 66 and amplifier 68, is used to regenerate the input signals and isolate outside noise from the circuitry, so that the signal-to-noise ratio (SNR) of the transmitter 46 can be maximized.

The size of the devices should be designed carefully. When the signal exists at the inputs, the signal should be amplified and latched. On the other hand, when noise exists at the inputs, the noise should be isolated from the internal circuitry, so that the system can obtain higher noise immunity.

As noted above, instead of using traditional constant envelope modulation/demodulation methods (such as BPSK, DPSK), ASK modulation scheme is used in this SSRFI architecture. ASK modulation is used because it is a simple modulation method, which is suitable for short distance communication. In addition, ASK modulation is compatible with envelope detection, because it has full of amplitude information.

Figure 6:
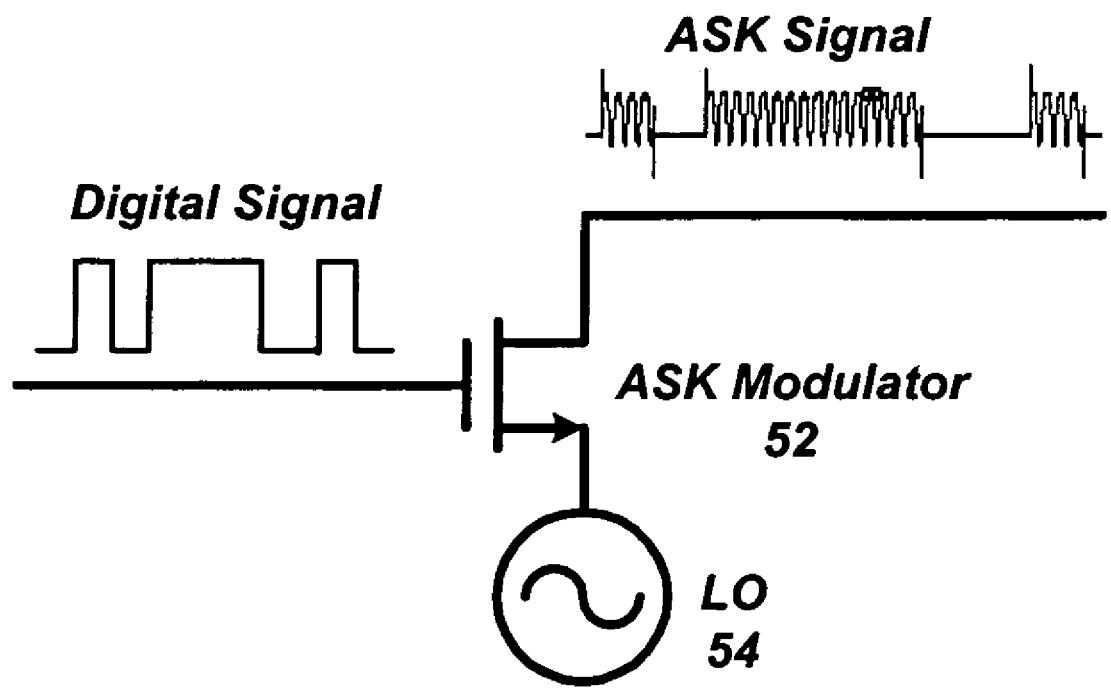
FIG. 6 illustrates an Amplitude Shift Keying (ASK) modulation implementation.

A schematic of the ASK modulator 52 and LO 54 is shown in FIG. 6, wherein the ASK modulator 52 performs simple modulation for suitable for short distance communication and compatible with peak detection in the receiver 56. Specifically, the ASK modulator 52 is used to generate an ASK modulated signal from an original baseband signal. The most important feature of the ASK modulator 52 is that the one device realization minimizes noise sources and power consumption. In addition, the one device realization can support high frequency applications. The size of the ASK modulator 52 must be chosen carefully, so that it is small enough to be driven by the previous stage (i.e., the input buffer) and, at the same time, it is large enough to drive the following stage (i.e., the coupling capacitor).

Figure 7:
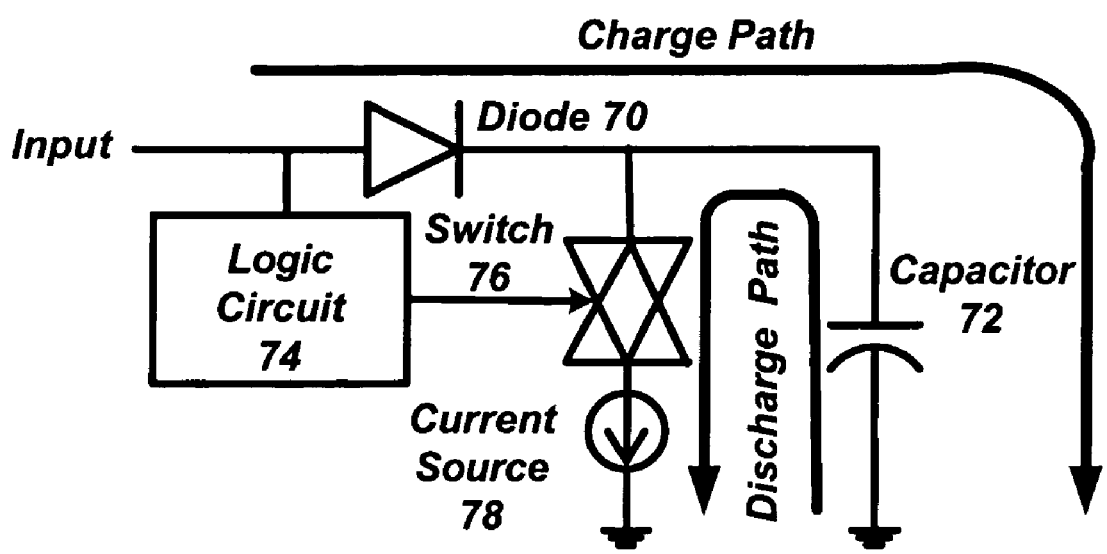
FIG. 7 illustrates a traditional peak detection method.

As noted above, a self-synchronized peak detector 60, which is used in the receiver 56 to recover a high frequency ASK modulated signal and convert it back to an original baseband signal. A schematic of the peak detector 60 is shown in FIG. 7, which uses a diode 70 in series with a capacitor 72 to detect the signal voltage peak, and also includes a logic circuit 74, bi-directional switch 76 and current source 78. The figure also indicates both the charge and discharge paths.

A conventional peak detector method has three constraints. First, the leakage current in-and-out of the capacitor 72 distorts the output signal. Second, it is hard to precisely control the high frequency clock timing to charge or discharge the capacitor 72. Third, a conventional peak detector cannot pass a "0" and "1" with equal efficiency.

Figure 8A:
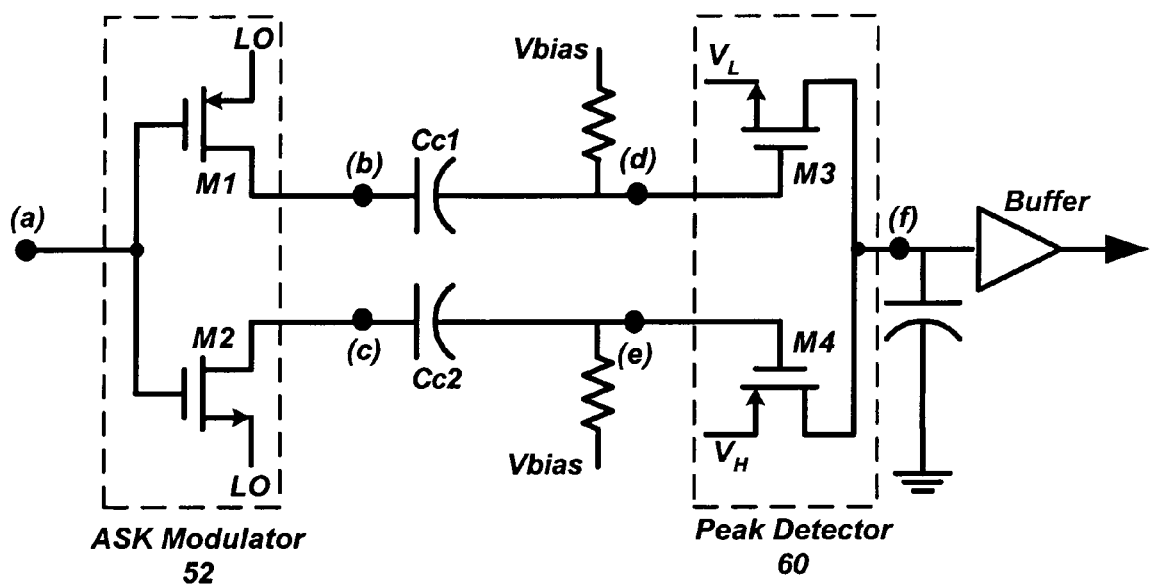
FIGS. 8A and 8B illustrate an improved peak detection scheme.

To overcome above drawbacks, the SSRFI uses an improved peak detector, as shown in FIG. 8A. FIG. 8A shows an ASK modulator 52 and a peak detector 60, each with a differential pair of switches or modulators M1-M2 and M3-M4 comprising a Push-and-Pull architecture. The peak detector 60 comprises a push-pull architecture to provide a logic "0" and "1" with equal efficiency, automatic timing, and no additional control circuit required.

The self-synchronization method of FIG. 8A has two key features. First, PMOS (positively-doped metal-oxide-silicon) and NMOS (negatively-doped metal-oxide-silicon) modulators M1, M2, M3 and M4 alternatively detect the signal to realize the Push-and-Pull architecture, so that the logic "0" and "1" can be passed equal efficiently without threshold loss. Second, this Push-and-Pull architecture is completely self-timing, which removes the needs for extra control circuitry and significantly simplifies the circuit design.

Figure 8B:
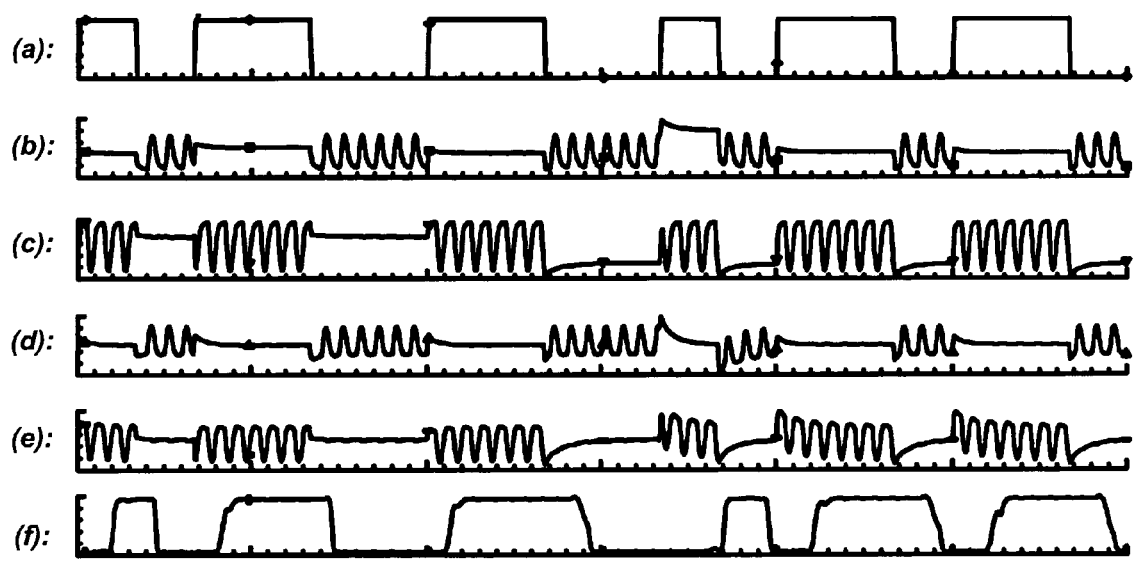

The peak detector 60 performs as follows. The signal at node (a) is the baseband input signal. After mixing with the LO 54 signal at modulators M1 and M2, the signals at node (b) and node (c) are modulated using high frequency ASK modulator 52 signals. When the baseband signal is low at node (a), modulator M1 turns on and the LO 54 signal passes through to node (b). When the baseband signal is high at node (a), modulator M2 turns on and the LO 54 signal passes through to node (c). After capacitive coupling at capacitors Cc1 and Cc2, the signals at node (b) and node (c) reach node (d) and node (e), respectively. The modulators M3 and M4 work as NMOS and PMOS diodes to detect the peak of the signal in node (d) and (e). When the LO 54 signal exists on node (d), Cload is discharged by the NMOS diode M3 to provide a logic "0". When the LO 54 signal exists on node (e), Cload is charged by the PMOS diode M4 to provide a logic "1". The original signal can be recovered as this process continues. The waveforms at the different nodes are shown in FIG. 8B.

The SSRFI facilitates jitter reduction by several methods. First, the self-synchronized peak detector, without the synchronization circuitry in the receiver and the simple implementation of the ASK modulator in the transmitter, dramatically reduces the noise sources in the circuitry, which decreases the jitter generation by the system. Second, the SSRFI is based on capacitive coupling, which is a high pass feature that can efficiently suppress low frequency noises, including device flicker noise and digital switching noise. Third, the noise isolation achieved by the input buffer improves the system's noise tolerance, which increases the system's jitter tolerance. Therefore, by reducing jitter generation, improving jitter transfer and jitter tolerance, this open loop SSRFI circuit, without systematic jitter accumulation, has better jitter performance than traditional close loop data recovery circuits.

In summary, the high frequency, low jitter, low power SSRFI of the present invention includes a number of novel aspects, including:

a high yield, low cost vertical interconnect scheme for 3D integration circuit;

the SSRFI is based on peak detection, which does not need synchronization between transmitter and receiver, so that it dramatically simplifies the RF transceiver circuitry and achieves high performance with good signal integrity;

the peak detection scheme outperforms traditional peak detection methods in several aspects, e.g., it is more reliable and robust, easy to realize and suitable for high frequency applications.;

the ASK modulation scheme is the simplest one compared with any previous ASK modulation schemes, wherein the structure of the ASK modulator facilitates low noise, low power and high performance features;

the combination of amplification and latches in both input and output buffers improves the system's performance by increasing the system's noise immunity.

CONCLUSION

This concludes the description of preferred embodiments of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for data communications, comprising:
    a Self-Synchronized Radio Frequency (RF) Interconnect (SSRFI) for vertically interconnecting components in a three-dimensional (3D) integrated circuit (IC), wherein the 3D IC includes a first layer with a receiver, a second layer with a transmitter, and one or more coupling capacitors provide an alternating current (AC) coupling method that interconnects the receiver and transmitter on the first and second layers, wherein the transmitter includes an input buffer that latches a baseband signal, and an Amplitude Shift Keying (ASK) modulator and local oscillator (LO) that together generate an ASK modulated signal from the latched baseband signal in order to charge the coupling capacitors, and wherein the receiver includes a self-synchronized peak detector that works as one or more diodes in order to detect one or more peaks of the ASK modulated signal discharged from the coupling capacitors, and to convert the detected peaks of the ASK modulated signal back to the baseband signal.

2. The apparatus of claim 1, wherein the input buffer regenerates a rail-to-rail signal to facilitate subsequent ASK modulation.

3. The apparatus of claim 1, wherein the ASK modulator performs simple modulation for suitable for short distance communication and compatible with peak detection in the receiver.

4. The apparatus of claim 1, wherein the receiver includes an output buffer.

5. The apparatus of claim 1, wherein the peak detector comprises a push-pull architecture to provide a logic "0" and "1" with equal efficiency, automatic timing, and no additional control circuit required.

6. A method for data communications, comprising:
vertically interconnecting components in a three-dimensional (3D) integrated circuit (IC) using a Self-Synchronized Radio Frequency (RF) Interconnect (SSRFI), wherein the 3D IC includes a first layer with a receiver, a second layer with a transmitter, and one or more coupling capacitors provide an alternating current (AC) coupling method that interconnects the receiver and transmitter on the first and second layers, wherein the transmitter includes an Amplitude Shift Keying (ASK) modulator and local oscillator (LO) that together generate an ASK modulated signal from an original baseband signal that is transmitted to the receiver, and wherein the receiver includes a self-synchronized peak detector that recovers the ASK modulated signal received from the transmitter and converts the recovered signal back to the original baseband signal.

7. The method of claim 6, wherein the input buffer regenerates a rail-to-rail signal to facilitate subsequent ASK modulation.

8. The method of claim 6, wherein the ASK modulator performs simple modulation for suitable for short distance communication and compatible with peak detection in the receiver.

9. The method of claim 6, wherein the receiver includes an output buffer.

10. The method of claim 6, wherein the peak detector comprises a push-pull architecture to provide a logic "0" and "1" with equal efficiency, automatic timing, and no additional control circuit required.

* * * * *